US010673785B2

(12) United States Patent
Narayana et al.

(10) Patent No.: US 10,673,785 B2
(45) Date of Patent: Jun. 2, 2020

(54) FLOW AND TIME BASED REASSEMBLY OF FRAGMENTED PACKETS BY IP PROTOCOL ANALYZERS

(71) Applicant: NetScout Systems, Inc, Westford, MA (US)

(72) Inventors: Chittaranjan Narayana, Karnataka (IN); Vijayalakshmi Nanjaiah, Karnataka (IN)

(73) Assignee: Netscout Systems, Inc., Westford, MA (US)

( * ) Notice: Subject to any disclaimer, the term of this patent is extended or adjusted under 35 U.S.C. 154(b) by 70 days.

(21) Appl. No.: 15/435,160

(22) Filed: Feb. 16, 2017

(65) Prior Publication Data
US 2018/0234360 A1  Aug. 16, 2018

(51) Int. Cl.
H04L 12/861 (2013.01)
H04L 29/06 (2006.01)
H04L 12/823 (2013.01)
H04L 12/741 (2013.01)
H04L 12/26 (2006.01)
H04L 12/851 (2013.01)

(52) U.S. Cl.
CPC .......... H04L 49/9057 (2013.01); H04L 43/02 (2013.01); H04L 45/74 (2013.01); H04L 47/2483 (2013.01); H04L 47/32 (2013.01); H04L 69/166 (2013.01); H04L 69/22 (2013.01)

(58) Field of Classification Search
None
See application file for complete search history.

(56) References Cited

U.S. PATENT DOCUMENTS

| 2003/0039250 A1* | 2/2003 | Nichols ................... H04L 47/10 370/394 |
| 2005/0021803 A1* | 1/2005 | Wren, III .......... H04L 29/06027 709/231 |
| 2006/0133364 A1* | 6/2006 | Venkatsubra ........... H04L 47/10 370/389 |
| 2008/0225847 A1* | 9/2008 | Manjunatha ............ H04L 47/32 370/389 |

(Continued)

FOREIGN PATENT DOCUMENTS

| EP | 2316201 A1 | 5/2011 |
| WO | WO-0245328 A1 | 6/2002 |
| WO | WO-2009157967 A1 | 12/2009 |

OTHER PUBLICATIONS

Extended European Search Report for European Patent Application No. 18157094.6, dated May 25, 2018.

Primary Examiner — Gregory B Sefcheck
Assistant Examiner — Amarnauth G Persaud
(74) Attorney, Agent, or Firm — Locke Lord LLP; Scott D. Wofsy; Christopher J. Capelli

(57) ABSTRACT

A method for processing a plurality of fragments of IP packet flows in a communication network includes receiving the plurality of packet fragments. The received packet fragments are associated with one or more packet flows. A first set of packet flows is selected from the one or more received packet flows. The first set of packet flows corresponds to a subset of the plurality of packet segments received during a first predetermined time interval. Only packet fragments associated with the first set of packet flows are reassembled into full packets.

9 Claims, 5 Drawing Sheets

(56) References Cited

U.S. PATENT DOCUMENTS

| | | | |
|---|---|---|---|
| 2011/0013636 A1* | 1/2011 | Rowell | H04L 43/026 370/395.1 |
| 2013/0094376 A1* | 4/2013 | Reeves | H04L 43/18 370/252 |
| 2014/0068763 A1* | 3/2014 | Ward | H04L 63/1425 726/22 |
| 2014/0280908 A1* | 9/2014 | Rothstein | H04L 43/026 709/224 |
| 2015/0229714 A1* | 8/2015 | Venkatsubra | H04L 1/0083 709/232 |
| 2015/0281089 A1* | 10/2015 | Marchetti | H04L 47/125 370/235 |
| 2018/0006926 A1* | 1/2018 | Balakrishnan | H04L 69/22 |

* cited by examiner

FLOW AND TIME BASED REASSEMBLY OF FRAGMENTED PACKETS BY IP PROTOCOL ANALYZERS

FIELD OF THE INVENTION

Embodiments of the present invention relate to network monitoring and, more particularly, to flow and time based reassembly of fragmented packets by IP protocol analyzers.

BACKGROUND OF THE INVENTION

Packet fragmentation is an inherent behavior of data transport in IP networks. A packet is a block of data with a strict upper limit on block size that carries with it sufficient identification necessary for delivery to its destination. Fragmentation is the process of breaking a packet into smaller pieces (fragments) so that they will fit into the frames of the underlying network. Upon receiving the fragments, the destination system reassembles the fragments into the original packet. The term MTU (maximum transmission unit) refers to the maximum amount of data that can travel in a frame. In other words, the MTU is the largest packet that can be sent through the network along a path without requiring fragmentation. Different networks have different MTU sizes, so packets may need to be fragmented in order to fit within the frames of the network that they transit.

Deep Packet Inspection (DPI) technology is well known in the art and is often utilized to monitor and troubleshoot IP networks. Typically, DPI systems inspect network traffic and display network addresses of the network traffic when a network event is detected. In addition, some DPI systems can also analyze traffic and determine application information associated with a network address (e.g., chat applications, audio and video applications, etc.). In a network using Internet Protocol Suite (TCP/IP), for example, a DPI system may provide IP addresses of traffic flow when a network event is detected. Using DPI method, to understand the behavior of IP networks, it is necessary to examine each packet. To collect useful information from the packets, a monitoring system typically needs to stitch (reassemble) the fragmented packets together in a highly reliable yet highly efficient manner.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method performed by a computer system having one or more processors and memory storing one or more programs for execution by the one or more processors for processing a plurality of fragments of IP packet flows in a communication network includes receiving the plurality of packet fragments. The received packet fragments are associated with one or more packet flows. A first set of packet flows is selected from the one or more received packet flows. The first set of packet flows corresponds to a subset of the plurality of packet fragments received during a first predetermined time interval. Only packet fragments associated with the first set of packet flows are reassembled into full packets.

In another aspect, a computer program product for processing a plurality of fragments of IP packet flows in a communication network is provided. The computer program product includes one or more computer-readable storage devices and a plurality of program instructions stored on at least one of the one or more computer-readable storage devices. The plurality of program instructions includes program instructions to receive the plurality of packet fragments. The received packet fragments are associated with one or more packet flows. The plurality of program instructions also includes program instructions to select a first set of packet flows from the one or more received packet flows. The first set of packet flows corresponds to a subset of the plurality of packet fragments received during a first predetermined time interval. The plurality of program instructions further includes program instructions to reassemble into full packets only packet fragments associated with the first set of packet flows.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
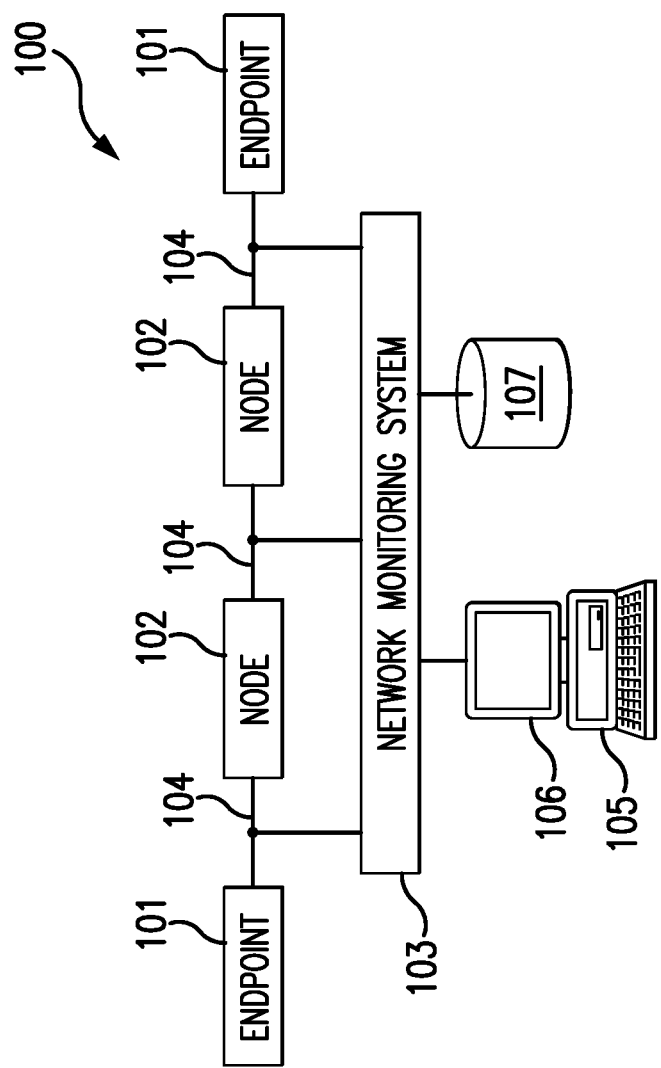
FIG. 1 is a block diagram of a network monitoring environment according to some embodiments.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

FIG. 1 illustrates a block diagram of a network monitoring environment according to some embodiments. Particularly, telecommunications network 100 includes network nodes 102 and endpoints 101. For example, network 100 may include a wireless broadband network, a 3G network, a 4G network, a 3GPP Long Term Evolution (LTE) network, a voice-over-IP (VoIP) network, an IP Multimedia Subsystem (IMS) network, etc. Although only two nodes 102 and two endpoints 101 are shown in FIG. 1, it will be understood that network 100 may comprise any number of nodes 102 and endpoints 101. Moreover, it will be understood that the nodes 102 and endpoints 101 in network 100 may be interconnected in any suitable manner, including being coupled to one or more other nodes 102 and/or endpoints 101.

In some implementations, endpoints 101 may represent, for example, computers, mobile devices, user equipment (UE), client applications, server applications, or the like. Meanwhile, nodes 102 may be components in an intranet, Internet, or public data network, such as a router or gateway. Nodes 102 may also be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints 101.

Still referring to FIG. 1, many packets traverse links 104 and nodes 102, as data is exchanged between endpoints 101. These packets may represent many different sessions and protocols. For example, if endpoint 101 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If endpoint 101 is used to send or retrieve email, nodes 102 may exchange Internet Message Access Protocol (IMAP), Post Office Protocol 3 Protocol (POP3), or Simple Mail Transfer Protocol (SMTP) messages with an email server (i.e., the other endpoint 101). If endpoint device 101 is used to download or stream video, device 101 may use Real Time Streaming Protocol (RTSP) to establish and control media sessions with a video server (i.e., the other endpoint 101). Alternatively, the user at endpoint 101 may access a number of websites using Hypertext Transfer Protocol (HTTP) to exchange data packets with a web server (i.e., the other endpoint 101). In some cases, communications may be had using the GPRS Tunneling Protocol (GTP). It will be understood that packets exchanged between endpoints 101 may conform to numerous other protocols now known or later developed.

Network monitoring system 103 may be used to monitor the performance of network 100. Particularly, monitoring system 103 captures packets that are transported across links or interfaces 104 between nodes 102, endpoints 101, and/or any other network links or connections (not shown). In some embodiments, packet capture devices may be non-intrusively coupled to network links 104 to capture substantially all of the packets transmitted across the links. Although only three links 104 are shown in FIG. 1, it will be understood that in an actual network there may be dozens or hundreds of physical, logical or virtual connections and links between network nodes. In some cases, network monitoring system 103 may be coupled to all or a high percentage of these links. In other embodiments, monitoring system 103 may be coupled only to a portion of network 100, such as only to links associated with a particular carrier or service provider. The packet capture devices may be part of network monitoring system 103, such as a line interface card, or may be separate components that are remotely coupled to network monitoring system 103 from different locations.

Monitoring system 103 may include one or more processors running one or more software applications that collect, correlate and/or analyze media and signaling data packets from network 100. Monitoring system 103 may incorporate protocol analyzer and/or traffic analyzer functionality that provides OSI (Open Systems Interconnection) Layer 2 to Layer 7 troubleshooting by characterizing IP traffic by links, nodes, applications and servers on network 100.

Protocol analyzers deal with decoding of packets into a plurality of protocol fields as they are seen on communication links 104. Communication links 104 can be of varying speeds with higher speed links having higher number of packets per second. This speed is usually measured in bits per second (bps) or alternately in data packets per second. In some embodiments, links 104 can have speeds approximately equal to 1 Gbps (Giga bits per second), while in alternative embodiments, network 100 may have some links 104 having 100 Gbps capacity. On a given communication link 104 any number of computer devices might be exchanging data with one or more other devices. Each instance of such communication between a pair of devices would consist of packets of data. In some embodiments, network 100 may impose a maximum size for a data unit in the network 100. This imposed maximum data unit size is commonly referred to as the MTU. The MTU may be based on a number of factors, including hardware capabilities of devices, requirements of particular protocols and/or standards, and so on. For example, network 100 may impose an MTU to prevent large data units from monopolizing a transmission medium for a significant period of time and thus delaying transmission of other data units. An MTU may be fixed by a standard (e.g., Ethernet) or decided at connect time, for example. A given packet, depending on its size and network capability may or may not be fragmented. Depending on speeds of links 104 and their utilizations, there could be thousands of endpoint 101 pairs exchanging data resulting in millions of packets per second.

Monitoring system 103 may further comprise internal or external memory 107 for storing captured data packets, user session data, and configuration information. Monitoring system 103 may capture and correlate the packets associated specific data sessions on links 104. In some embodiments, related packets can be correlated and combined into a record for a particular flow, session or call on network 100. These data packets or messages may be captured in capture files. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

As the capability of network 100 increases toward 10 Gigabit Ethernet (10GE) and beyond (e.g., 100GE), each link 104 may support more users' flows and sessions. Thus, in some embodiments, link 104 may be a 10GE or a collection of 10GE links (e.g., one or more 100GE links) supporting thousands or tens of thousands of users or subscribers. Many of the subscribers may have multiple active sessions, which may result in an astronomical number of active flows on link 104 at any time where each flow includes many packets.

Figure 2:
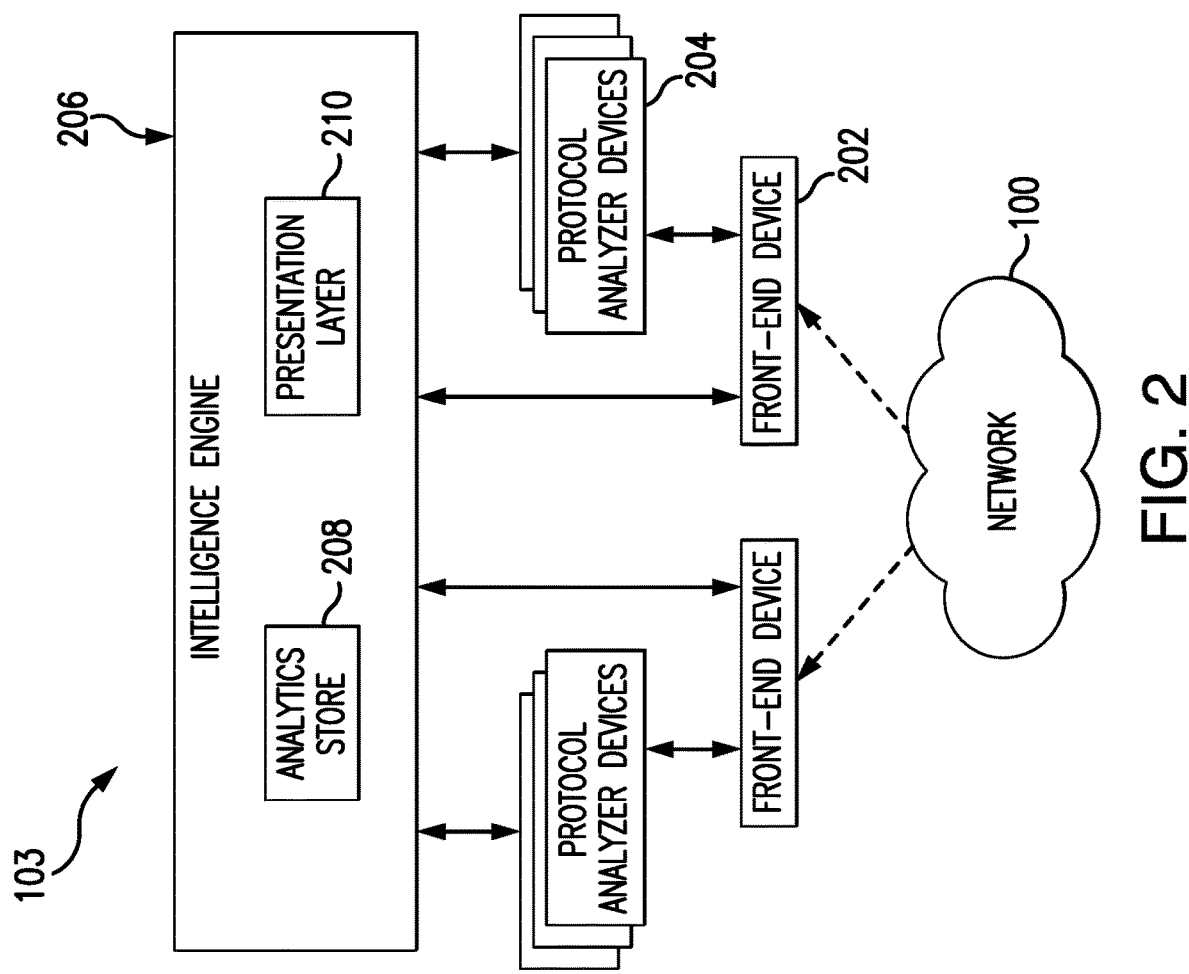
FIG. 2 is a block diagram of a hierarchical network monitoring system according to some embodiments.

Turning to FIG. 2, an example of network monitoring system 103 is illustrated according to some embodiments. As shown, one or more front-end monitoring devices or probes 202 (i.e., a first tier of a three-tiered architecture) may be coupled to network 100. Each of front-end devices 202 may also be coupled to one or more protocol analyzer devices 204 (i.e., a second tier), which in turn may be coupled to intelligence engine 206 (i.e., a third tier). Front-end devices 202 may also be directly coupled to intelligence engine 206, as described in more detail below. Typically, front-end devices 202 may be capable or configured to process data at rates that are higher (e.g., about 10 or 100 times) than protocol analyzers 204. Although the system of FIG. 2 is shown as a three-tier architecture, it should be understood by a person of ordinary skill in the art in light of this disclosure that the principles and techniques discussed herein may be extended to a smaller or larger number of tiers (e.g., a single-tiered architecture, a four-tiered architecture, etc.).

Generally speaking, front-end devices 202 may passively tap into network 100 and monitor all or substantially all of its data. For example, such one or more of front-end devices 202 may be coupled to one or more links 104 of network 100 shown in FIG. 1. Meanwhile, protocol analyzer devices 204 may receive and analyze a subset of the traffic that is of interest, as defined by one or more rules. Front-end devices 202 in order to decode packets have to first reassemble the packets into original packets as sent by the source device (i.e., one of endpoints 101 in FIG. 1). As there are millions of packets per second and there are thousands of device pairs communicating, the available hardware resources like CPU, memory and disk I/O will limit how effectively and efficiently fragmented packets could be reassembled by front-end devices 202. Thus, either delay in processing would occur or not all fragmented packets would be reassembled into the original IP packet content. Those packets that are not reassembled fully would yield incomplete or wrong or no information when decoded by front-end devices 202.

There are at least three factors that have an impact on performance and processing load and hence affect effectiveness of reassembly: the number of packets being processed, the number of flows being processed and the number of fragments being processed. Generally, higher speed of the link 104, higher is the number of packets for a given percentage utilization. The link utilization is proportionate to the number of packets for a given link speed. A number of flows represents a number of unique pairs of devices (i.e., endpoints 101) exchanging information over a plurality of links 104. Same pair of endpoints 101 could have one or more flows depending on how many different instances/sessions in parallel they are maintaining. A number of the received fragment packets, in turn, is dependent on original packet size and network MTU size, network latency or inter packet delay. Arrival times of a sequence of packets (e.g., 200 packets) belonging to the desired flow could be delayed or packet may arrive out of order. Thus, front-end devices 202 have to wait longer to collect all fragments of the original packet for a flow.

Referring back to FIG. 2, intelligence engine 206 may include a plurality of distributed components configured to perform further analysis and presentation of data to users. For example, intelligence engine 206 may include analytics store 208 and presentation layer 210.

In some embodiments, front-end devices 202 may be configured to monitor all of the network traffic that it is tapped into (e.g., 10GE, 100GE, etc.). Front-end devices 202 may also be configured to intelligently distribute traffic based on a user session level. Additionally or alternatively, front-end devices 202 may distribute traffic based on a transport layer level.

Front-end devices 202 may also be configured to aggregate data to enable backhauling, filtering out unwanted data, classification, and DPI analysis. In addition, front-end devices 202 may be configured to distribute data to the back-end monitoring tools (e.g., protocol analyzer devices 204 and/or intelligence engine 206) in a variety of ways, which may include flow based or user session based balancing. Devices 202 may also receive dynamic load information (e.g., namely CPU and memory utilization) from each of protocol analyzer devices 204 so to enable intelligent distribution of data.

Protocol analyzer devices 204 may be configured to passively monitor a subset of the traffic that has been forwarded to it by the front-end device(s) 202. In addition, protocol analyzer devices 204 may be configured to notify front-end device(s) 202 regarding its CPU and/or memory utilization so that front-end device(s) 202 can utilize this information to intelligently distribute traffic.

Intelligence engine 206 may follow a distributed and scalable architecture. In some embodiments, presentation layer 210 may be configured to present event and other relevant information to the end-users. Analytics store 208 may include a storage or database for the storage of analytics data or the like.

In some implementations, protocol analyzer devices 204 and/or intelligence engine 206 may be hosted at an offsite location (i.e., at a different physical location remote from front-end devices 202). Additionally or alternatively, protocol analyzer devices 204 and/or intelligence engine 206 may be hosted in a cloud environment.

Figure 3:
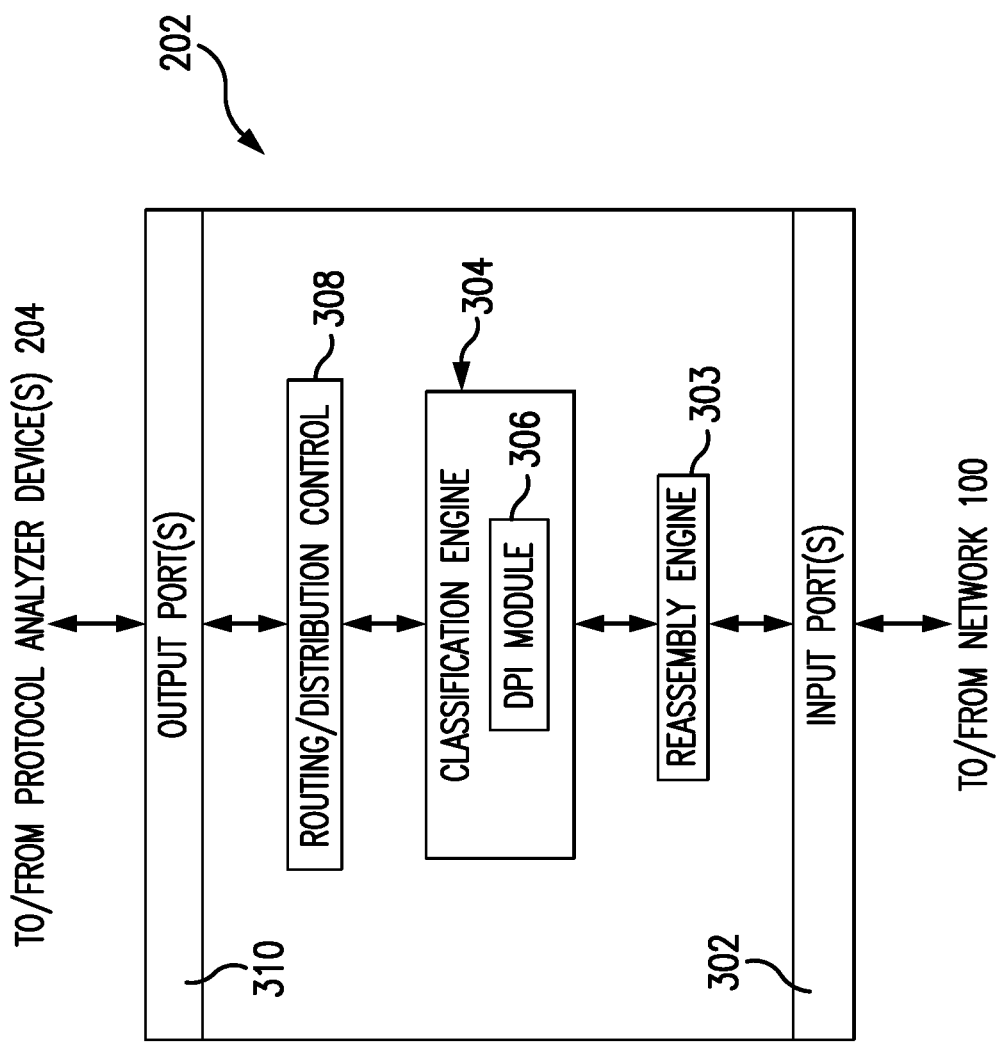
FIG. 3 is a block diagram of a monitoring probe according to some embodiments.

FIG. 3 is a block diagram of an example of front-end monitoring probe 202 according to some embodiments. Input port(s) 302 (e.g., 8, 40, or 100 GB/s) may be coupled to network 100 and to reassembly engine 303. The reassembly engine 303, in turn, may be coupled to classification engine 304, which may include DPI module 306. Classification engine 304 may be coupled to routing/distribution control engine 308. Routing engine 308 may be coupled to output port(s) 310, which in turn may be coupled to one or more protocol analyzer devices 204.

In some implementations, front-end probe or device 202 may be configured to receive traffic from network 100, for example, at a given data rate (e.g., 10 Gb/s, 100 Gb/s, etc.), and to transmit selected portions of that traffic to one or more protocol analyzers 204, for example, at a different data rate. Reassembly engine 303 may provide reassembly functionality, handling of transmission errors, handling of lost and misinserted packets, and timing and flow control. Classification engine 304 may identify user sessions, types of content, transport protocols, etc. (e.g., using DPI module 306). In some cases, classification engine 304 may implement one or more rules to allow it to distinguish high-value traffic from low-value traffic and to label processed packets accordingly. Routing/distribution control engine 306 may implement one or more load balancing or distribution operations, for example, to transfer high-value traffic to a first protocol analyzer and low-value traffic to a second protocol analyzer.

In some cases, classification engine 304 may be session context aware (e.g., web browsing, protocol specific, etc.). Further, front-end device 202 may be SCTP connection aware to ensure, for example, that all packets from a same connection are routed to the same one of front end devices 202.

In various embodiments, blocks 302-310 may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

As noted above, the available hardware resources like CPU, memory and disk I/O may limit how effectively and efficiently fragmented packets could be reassembled by the front end devices 202. In order to manage resource or performance constraints, conventional network monitoring systems utilize one of the following two approaches for managing computing resources. One approach focuses on a means for setting a batch size for packets within which the fragments for each packet are looked for and reassembled in a pool (store or file) of packets. For example, a batch size could be 10,000 input packets. If packet's fragments are not found in the batch, then the packet is ignored. Another approach focuses on reassembling all fragments for all packets in a pool (e.g., a file).

Furthermore, none of the above prior art approaches adequately deals with effective reassembly, performance and/or resource constraints issues. In the first approach, while the resource and performance can be managed by limiting the batch size, the effectiveness of reassembly will be compromised as all required fragments might not be available in the given batch. Also, by fixing the batch size, utilization variations cannot be addressed by a monitoring system. For example, reserved resources normally contain excess inventory generated by batch sizes larger than needed immediately. Even if resources are adequately reserved initially, increased utilization during packet processing would mean increase in number of packets and hence the batch size.

In using the second prior art approach, the full set of packets is available in the pool. While this approach addresses the effectiveness of reassembly, it is not capable of addressing the high performance and resource requirements. As pool size increases, the performance typically deteriorates and resource requirements increase linearly.

In other words, number of packets processed by a monitoring system is directly proportional to link speed and percentage utilization of a given link. Resource utilization (i.e., memory and/or disk utilization) is directly proportional to number of packets (i.e., to the size of the batch or file). Furthermore, performance measures (i.e., time to process) are directly proportional to number of packets in a batch or file. As number of packets increases, the batch size or file size increases as well. In this way, it is possible to improve the effectiveness of reassembly of a monitoring system by allocating more resources, but these measures cannot guarantee any operation, usability and performance improvements. By keeping batch size or file size fixed for a link speed, rather than dynamically adjusting it, utilization variation is not adequately addressed. Higher utilization and other performance metrics can bring more packets beyond the predetermined size.

Various embodiments of the present invention solve the above problems by incorporating a method to process a plurality of fragments of IP packet flows in a communication network that keeps the effectiveness of reassembly constant at varying link speeds. In one exemplary embodiment, a novel method presented herein makes the performance degradation non-linear with respect to increased link speed or utilization. Effectiveness of reassembly should remain constant with variation in utilization of a given link.

Embodiments of the subject matter disclosed herein use time and flow as primary dimensions to solve the above problems. Advantageously, by keeping track of the time dimension, the methods contemplated by various embodiments ensure contemporaneously that link speed variations and utilization variations do not affect the data integrity and the reassembly capability. Processing framework, in accordance with one embodiment of the present invention, for any given link speed or utilization, considers the packets for reassembly (in accordance with the batch or file size) only for a fixed pre-configured time interval T.

Figure 4:
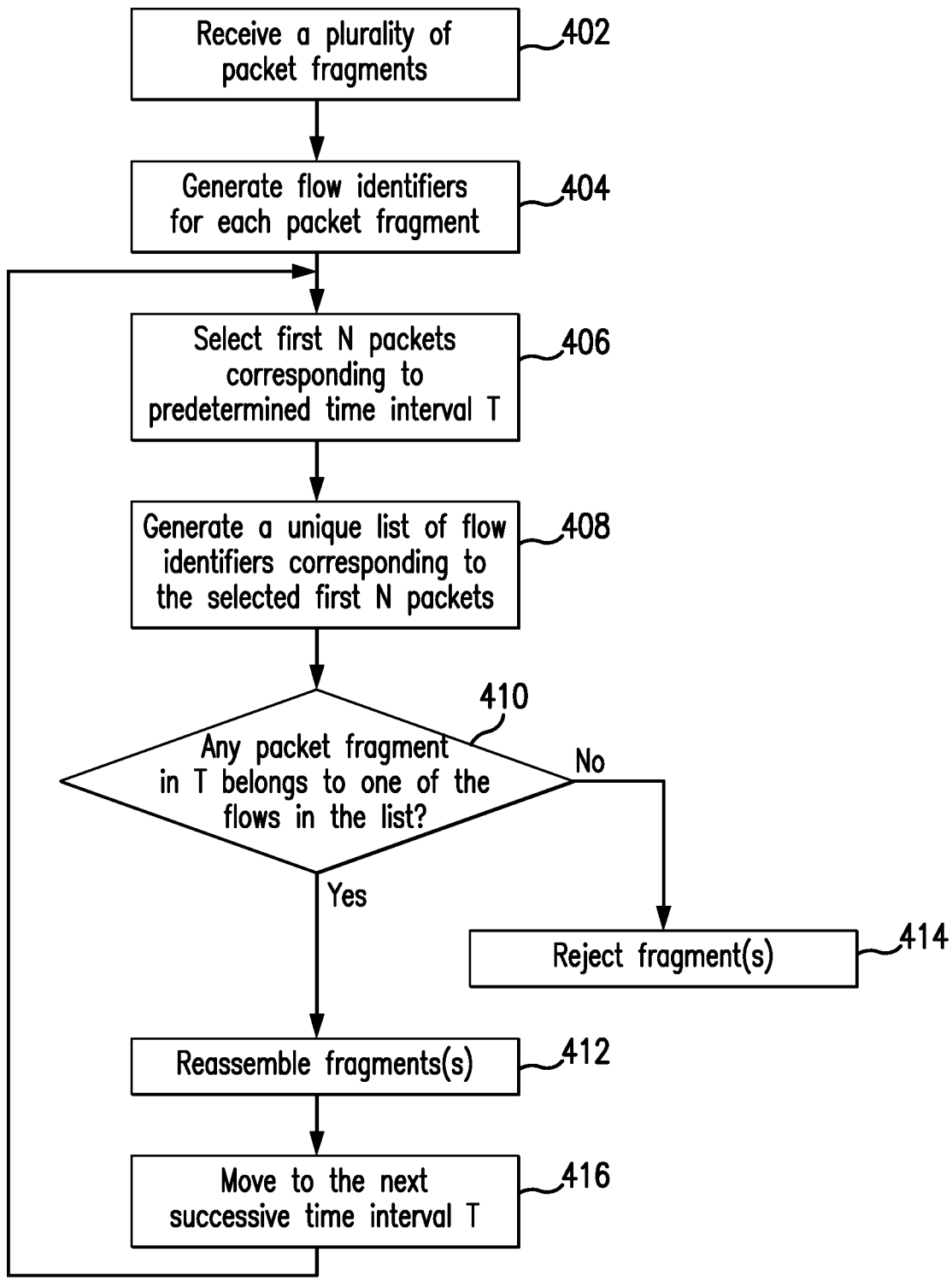
FIG. 4 is a flowchart of operational steps carried out by the reassembly engine of FIG. 3, in accordance with an illustrative embodiment of the present invention.

FIG. 4 is a flowchart of operational steps of the reassembly engine of FIG. 3, in accordance with exemplary embodiments of the present invention. Before turning to description of FIG. 4, it is noted that the flow diagram shown therein is described, by way of example, with reference to components shown in FIGS. 1-2 and 3, although these operational steps may be carried out in any system and are not limited to the scenario shown in the aforementioned figure. Additionally, the flow diagram in FIG. 4 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

In this embodiment, the reassembly engine 303 makes a batch or the file size a function of time. Accordingly, varying link data transfer speed and/or bandwidth utilization cause proportional variations in file/batch sizes. In order to keep the performance degradation non-linear, the reassembly engine 303 takes into account the flow dimension and utilizes just in time reassembly approach. "Flow", as used herein, refers to a conversation instance between a pair of devices, i.e., endpoint devices 101 in FIG. 1. The reassembly engine 303 is configured and operable to locate and reassemble fragmented packets that belong to the same flow.

At 402, the reassembly engine 303 receives a plurality of packet fragments from one or more input ports 302. The received packet fragments may be portions of the data payload of the IP packet each with an IP header including a flow identifier on the basis of a MTU for a transmission link within the communication network 100.

Next, at step 404, the reassembly engine 303 passes through every single received packet fragment and generates flow identifiers for each packet fragment based on IP packet header information. Each flow identifier indicates that the fragment corresponds to a particular flow.

According to an embodiment of the present invention, to provide batch size or file size that is less susceptible to fluctuations in bandwidth, the reassembly engine 303, in one embodiment, reassembles a subset of the received fragments over a time sliding window (TSW). The time sliding window is composed of a contiguous set of M time intervals, wherein each interval is a preselected fixed duration of ts milliseconds. The duration of ts milliseconds is selected so as to be sufficiently short so as to minimize the number of packets considered for reassembly, whereas M should be large enough to consider all received packet fragments. In one embodiment each time interval T is approximately equal to 10 ms. According to an embodiment of the present invention, at step 406, the reassembly engine 303 selects a set of N packets corresponding to the first time interval with the set of M intervals.

Next, at 408, the reassembly engine 303 generates a unique list Fn of non-repeated flow identifiers for the first N packets selected in step 406. At 410, the reassembly engine 303 makes another pass through the received plurality of packet fragments to determine whether the packet fragment under consideration is associated with one of the flows in the list Fn generated at step 408. Each fragment of the plurality of packet fragments is correlated with a corresponding packet flow based on a flow identifier. If a determination is made as to whether the considered packet fragment is not associated with one of the flows in the list Fn (decision block 410, "No" branch), at step 414, the reassembly engine 303 discards the considered packet fragment. In other words, at step 414, the reassembly engine 303 discards packets which are not found within the pre-configured TSW.

According to an embodiment of the present invention, in response to determining that the packet fragments under consideration are associated with one of the flows in the list Fn (decision block 410, "Yes" branch), at step 412, the reassembly engine 303 reassembles only these packet fragments. Put differently, the reassembly engine 303 performs IP packet reassembly of a subset of the received packet fragments if and only if each fragment in this subset falls within the predefined TSW.

Once all identified packet fragments associated with the first time period are reassembled, the reassembly engine 303 advances to a subsequent sliding window—successive time interval T (step 416)—and repeats steps 406-416 for this second predefined time interval. At least in some embodiments, there might be an overlapping portion between the first and second time intervals.

According to an alternative embodiment of the present invention, the reassembly engine 303 may also directly forward reassembled packets to one or more components of the intelligence engine 206, such as, but not limited to presentation layer 210. In turn, the presentation layer 210 may present the decoded information associated with every reassembled packet to a user in a human readable format. According to this embodiment, at any given point of time, the presentation layer 210 may use preconfigured criteria to determine how many reassembled packets P to show to a user. These preconfigured criteria not necessarily take into account either the speed or the utilization of the communication link. The number of shown packets is driven more by GUI settings of users' display devices in communication with the presentation layer 210. In one embodiment, the presentation layer 210 presents less than 100 packets to users. It should be noted that, the presentation layer 210 receives packets that were previously completely reassembled by the reassembly engine 303. As discussed above, the reassembly engine 303 performs IP packet reassembly of a subset of the received packet fragments if and only if each fragment in this subset falls within a predefined TSW. In this particular embodiment, the reassembly engine 303 does not necessarily need to reassemble more than P packets than can be shown to a user by the presentation layer 210. This process of reassembling packet fragments can be continued by the reassembly engine 303 in real time, as the user progresses forward in time dimension. During the second iteration, the reassembly engine 303 reassembles only packet fragments found within a second preconfigured time window (TSW).

In summary, various embodiments of the present invention describe a novel adaptive method for processing a plurality of fragments of IP packet flows in a communications network that keeps the effectiveness of reassembly constant at varying link speeds. In one exemplary embodiment, the method presented herein makes the performance degradation non-linear with respect to increased link speed or utilization. Effectiveness of reassembly should remain constant with variation in utilization of a given link.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
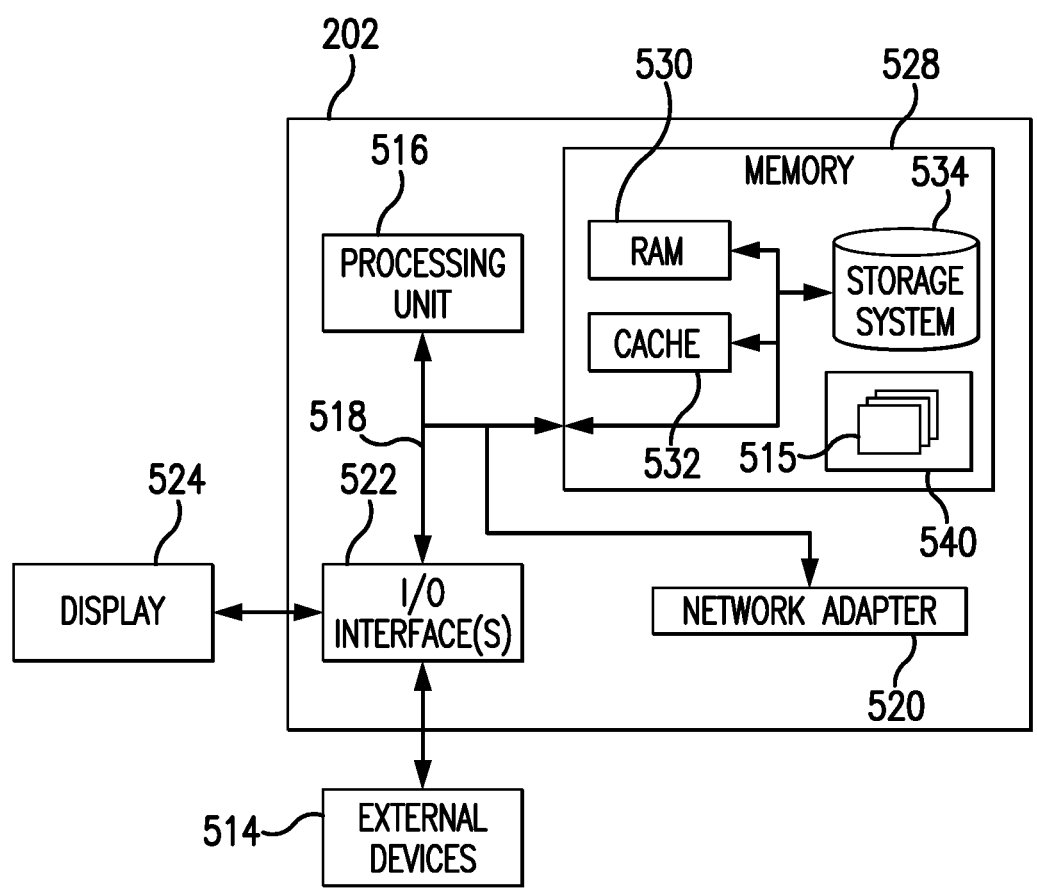
FIG. 5 illustrates internal and external components of a front end device in accordance with illustrative embodiments of the present invention.

Embodiments of network monitoring framework may be implemented or executed by a centralized network monitoring system comprising one or more computer devices. One such device, namely front end device 202 is illustrated in FIG. 5. In various embodiments, front end device 202 may be a server, a workstation, a network computer, a desktop computer, a laptop, or the like.

Front end device 202 is only one example of a suitable system and is not intended to suggest any limitation as to the scope of use or functionality of embodiments of the invention described herein. Regardless, front end device 202 is capable of being implemented and/or performing any of the functionality set forth hereinabove.

Front end device 202 may be described in the general context of computer system-executable instructions, such as program modules, being executed by a computer system. Generally, program modules may include routines, programs, objects, components, logic, data structures, and so on that perform particular tasks or implement particular abstract data types. Front end device 202 may be practiced in distributed data processing environments where tasks are performed by remote processing devices that are linked through a communications network. In a distributed data processing environment, program modules may be located in both local and remote computer system storage media including memory storage devices.

Front end device 202 is shown in FIG. 5 in the form of a general-purpose computing device. The components of front end device 202 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Front end device 202 typically includes a variety of computer system readable media. Such media may be any available media that is accessible by front end device 202, and it includes both volatile and non-volatile media, removable and non-removable media.

System memory 528 can include computer system readable media in the form of volatile memory, such as random access memory (RAM) 530 and/or cache memory 532. Front end device 202 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515 (i.e., reassembly engine 303) may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Front end device 202 may also communicate with one or more external devices 514 such as a keyboard, a pointing device, a display 524, etc.; one or more devices that enable a user to interact with network monitoring system 103; and/or any devices (e.g., network card, modem, etc.) that enable front end device 202 to communicate with one or more other computing devices. Such communication can occur via Input/Output (I/O) interfaces 522. Still yet, front end device 202 can communicate with one or more networks such as a local area network (LAN), a general wide area network (WAN), and/or a public network (e.g., the Internet) via network adapter 520. As depicted, network adapter 520 communicates with the other components of front end device 202 via bus 518. It should be understood that although not shown, other hardware and/or software components could be used in conjunction with front end device 203. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, performed by a computer system having one or more processors and memory storing one or more programs for execution by the one or more processors, for processing a plurality of fragments of IP packet flows in a communications network, the method comprising steps of:
   receiving the plurality of packet fragments, wherein the received packet fragments are associated with one or more packet flows over a preconfigured time sliding window (TSW) composed of a contiguous set of M time intervals, wherein each interval is a preselected fixed duration of ts milliseconds;
   selecting a first set of N packet flows from a first pass through of the one or more received packet flows, the first set of N packet flows corresponding to a subset of the plurality of packet fragments received during a first predefined time interval of the set of M time intervals of the TSW;
   generating a unique list of $F_n$ non-repeated flow identifiers for the first selected set of N packet flows of non-repeated flow identifiers;
   determining, by a second pass through of the received packet flows, if a received packet fragment is associated with a flow identifier contained in the generated unique list of $F_n$ non-repeated flow identifiers;
   discarding the received packet fragment not found in the preconfigured TSW, based upon the determination of whether the received packet fragment is not associated with a flow identifier contained in the generated unique list of non-repeated flow identifiers; and
   reassembling only packet fragments associated with the first set of packet flows into full packets only if the packet fragments are received in the first predetermined time interval.

2. The method as recited in claim 1, further comprising discarding packet fragments that are not associated with the first set of packet flows.

3. The method as recited in claim 1, further comprising presenting the full packets to a user by the computer system.

4. The method as recited in claim 3, wherein the step of presenting the full packets to the user further comprises the step of performing Deep Packet Inspection (DPI) analysis on the full packets prior to presenting the full packets to the user.

5. The method as recited in claim 3, wherein the size of the subset is selected based on a number of the full packets to be presented to the user.

6. The method as recited in claim 1, further comprising the steps of:
   selecting a second set of packet flows, from the one or more received packet flows, corresponding to a subset of the plurality of packet segments received during a second predefined time interval; and
   reassembling only packet fragments associated with the second set of packet flows into full packets.

7. The method as recited in claim 1, wherein bandwidth characteristics of the transmission link vary over time.

8. The method as recited in claim 1, wherein each fragment of the plurality of packet fragments contains a valid IP header comprising a flow identifier on the basis of a Maximum Transmission Unit (MTU) for a transmission link within the communication network.

9. The method as recited in claim 8, wherein each fragment of the plurality of packet fragments is correlated with a corresponding packet flow based on the flow identifier.

\* \* \* \* \*